United States Patent [19]

Miyazaki et al.

[11] Patent Number: 4,834,007

[45] Date of Patent: May 30, 1989

[54] DATA INPUT DEVICE HAVING AN EDITING FUNCTION FOR AN EMBROIDERING SEWING MACHINE

[75] Inventors: Kenichi Miyazaki; Toshiaki Iizuka, both of Tokyo; Koichi Asai, Koganei, all of Japan

[73] Assignee: Janome Sewing Machine Co. Ltd., Tokyo, Japan

[21] Appl. No.: 114,877

[22] Filed: Oct. 28, 1987

[30] Foreign Application Priority Data

Oct. 31, 1986 [JP] Japan ................................ 61-258126

[51] Int. Cl.⁴ ............................................ D05B 19/00
[52] U.S. Cl. .............................. 112/121.11; 112/454; 112/456; 112/78; 112/457; 364/470
[58] Field of Search ............... 112/457, 456, 454, 458, 112/453, 266.1, 121.11, 121.12, 78, 98, 102, 103; 364/470, 400

[56] References Cited

U.S. PATENT DOCUMENTS

| | | | |
|---|---|---|---|
| 4,429,364 | 1/1984 | Maruyama et al. | 112/457 X |
| 4,664,047 | 5/1987 | Sano | 112/456 X |
| 4,691,649 | 9/1987 | Takano et al. | 112/457 X |

Primary Examiner—Peter Nerbun
Attorney, Agent, or Firm—Michael J. Striker

[57] ABSTRACT

The present invention relates to a data input device for an embroidering sewing machine, and more particularly to an input device having an editing function for an input pattern.

4 Claims, 6 Drawing Sheets

FIG_1

FIG_2

FIG_16

FIG_3

FIG_4

FIG_5

FIG_6

FIG_7

FIG_8

FIG_9

FIG_10

FIG_11

FIG_12

FIG_13

FIG_14

FIG_15 ical characters stores input orders thereof, and shows an imaginary outline of a pattern in a display device, a first embodiment of the present invention moves the separate blocks one by one by means of a correcting mode of operation before or after an input order is made so as to determine one range or a plurality of ranges of blocks to be corrected. In a one point correcting mode, an input coordinate point within a designated pattern forming block is moved and the points are designated one after another before or after the input order, thereby to decide the input point to be corrected, so that the correction can be made instantly and easily.

DATA INPUT DEVICE HAVING AN EDITING FUNCTION FOR AN EMBROIDERING SEWING MACHINE

BACKGROUND OF THE INVENTION

A conventional data input device of a sewing machine, programmingly controls stitching patterns and stores data of coordinates for stitching patterns in a floppy disc, and stitching data are corrected either by removing already entered stitching data one by one, or re-making them initially. Therefore, the editing operation is troublesome and it takes considerable time for editing stitching pattern data.

SUMMARY OF THE INVENTION

In the data input device of a sewing machine which inputs a plurality of separate forming blocks of embroidering patterns such as alphanumeric characters stores input orders thereof, and shows an imaginary outline of a pattern in a display device, a first embodiment of the present invention moves the separate blocks one by one by means of a correcting mode of operation before or after an input order is made so as to determine one range or a plurality of ranges of blocks to be corrected. In a one point correcting mode, an input coordinate point within a designated pattern forming block is moved and the points are designated one after another before or after the input order, thereby to decide the input point to be corrected, so that the correction can be made instantly and easily.

A second embodiment of the invention substitutes the designation of the block for the above mentioned function of the first embodiment. The block is designated freely by directly designating the point, irrespectively of the coordinate input order so as to designate a range or ranges of one or a plurality of blocks to be corrected. Therefore, the correction may be made more rapidly and more easily than in the first embodiment.

In the drawings, "CRT" designates a display device; "SP1" is an initial designating means; "SP2" and "SP3" are movement designating means; "SP4" is a prohibiting means; "SP5" and "SP11" are decision making means, "SP7" is a coordinate point showing means, and "SP9" and "SP10" are movement connecting means.

DETAILED DESCRIPTION OF THE INVENTION

(1ST EMBODIMENT)

Figure 16:
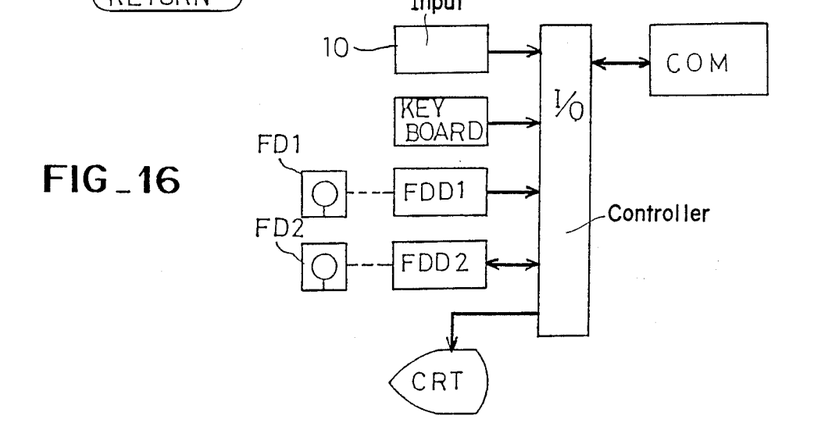
FIG. 16 is a block diagram showing a composition of the input data.

The present invention will be explained with reference to the first embodiment of a data input device shown in FIG. 16.

An input part 10 of a coordinate function is composed of a tablet and a cursor. An input face of the coordinate of the tablet is provided with an input part of the coordinate of an embroidering pattern. Each of the functions includes a stitching function in the input mode from the tablet of the embroidering pattern shown in Table 1 and an editing function in the correcting mode. The functions of the modes are shown in a display device (CRT) in response to the function input part of the tablet. An operator may select a desired function by pointing with the cursor the function input part on the tablet corresponding to a desired function shown in the display device (CRT). A floppy disc drive (FDD1) is inserted with a system disc (FD1) of the data input device prior to making data, and RAM of a computer (COM) is read in with a control program of the data input device and a program for making embroidering data and editing program.

The display device (CRT) monitors an inputting condition when inputting data and an operating condition when editing the input data. The floppy disc (FDD) is inserted with a data disc (FD2) in a writing-in mode of the data, and this data disc is written in with embroidering data made by the data input device, and the data written in the data disc is read in for edition and shown in the display disc (CRT).

Figure 5:
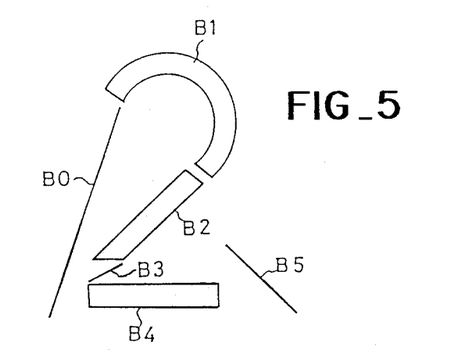
FIG. 5 shows an example of dividing an embroidering pattern into a plurality of stitching blocks.

An inputting manner of an embroidering pattern will be explained in connection with an example of a character "2" as an input pattern. The pattern data of the character 2 is, as shown in FIG. 5, divided into pattern forming blocks (B0, B1 ... B5), and those six blocks are input in orders shown in FIGS. 6 to 9. An input function of the data is, for inputting, pointed at in a main screen, and stitching functions as shown in Table 1 are shown in a subscreen, and a desired stitching is selected and a coordinate point thereof is input.

TABLE 1

| Function | Input coordinate points |
| --- | --- |
| 1. Connection of arc | 6 (4*1) |
| 2. Connection of straight line | 4 (2*1) |
| 3. Stitching of arc | 2*2 |
| 4. Stitching of straight line | 1*2 |
| 5. JUMP stitching | 1*2 |
| 6. Point stitching | 1*2 |
| 7. Stop of sewing machine | 0*2 |

*1: If a block before one is a close stitching, two points are used in common to two blocks.
*2: A last point of the block before one is always used in common.

Numbers of input coordinate points for the functions have been determined as shown in Table 1, and one block is formed only by inputting these numbers.

The term "block" designates a minimum pattern stitching component

Figure 6:
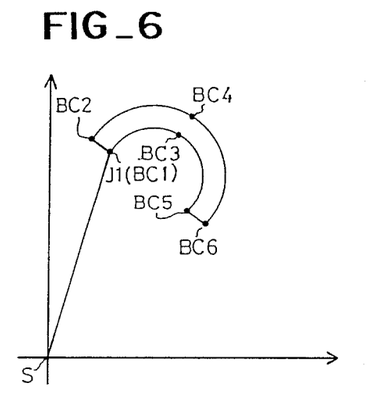
FIGS. 6 to 9 explain input orders for the embroidering pattern.

The input of the coordinate points is done, as shown in FIGS. 6 to 9, in the following sequence:

(a) The JUMP stitching is selected, and a coordinate point J1 is input (FIG. 6).
(b) The connection stitching of the arc is selected, and the coordinates of points BC1, BC2, BC3, BC4, BC5, BC6 are input (FIG. 6).

Figure 7:
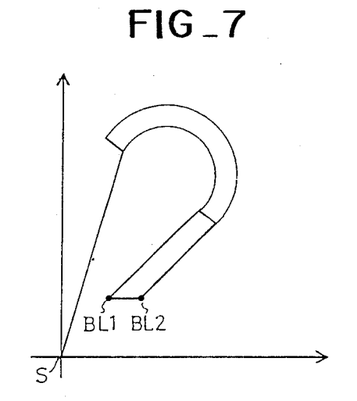
Figure 8:
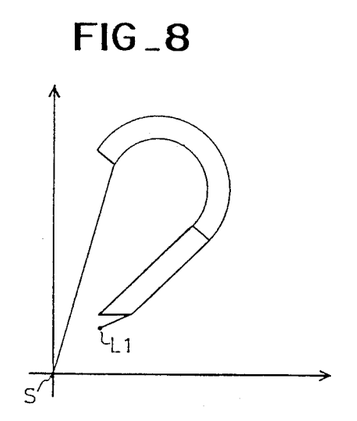
Figure 9:
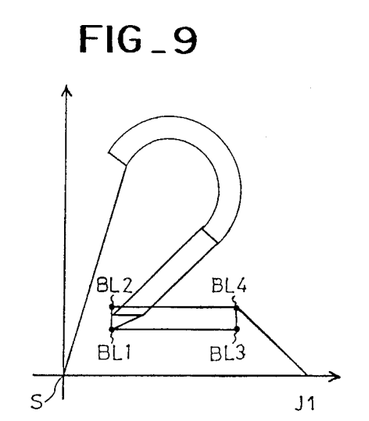

(c) The connection stitching of the straight line is selected, and the coordinates of points BL1, BL2 are input (FIG. 7).
(d) The straight stitching is selected, and the coordinate of point L1 is input (FIG. 8).
(e) The connection stitching of the straight line is selected, and the coordinates of points BL1, BL2, BL3, BL4 are input (FIG. 9).
(f) The JUMP stitching is selected, and the coordinate point J1 is input (FIG. 9).

When the coordinate points are input as mentioned above, segments of the connection stitchings illustrated in FIGS. 6–9 are shown in the display device (CRT) which shows the segments as the imaginary outline of the straight stitching for confirmation.

Figure 1:
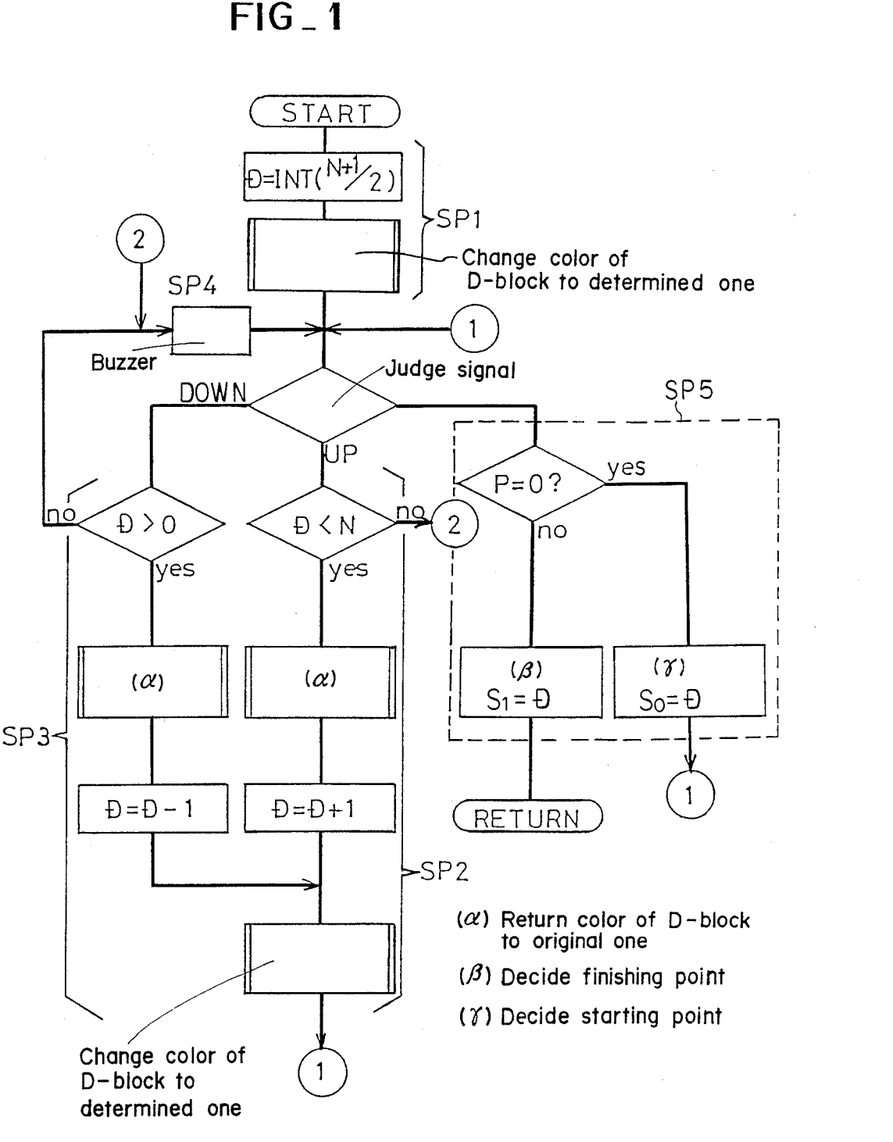
FIG. 1 is a flow chart of a program for designating a range of a block.

FIG. 1 shows a flow chart of a program for designation of the range of the block in a pattern and for correcting the corresponding data after having input the embroidering data.

A position is pointed at with the cursor on the tablet of a correcting function shown in the main screen of the display device (CRT), and this screen is changed to a subscreen. Each of the blocks is marked in the input order with as a 0 block, 1st block . . . N block.

(INITIAL DESIGNATION INSTRUMENT)

In the correcting mode, the block which has been firstly designated with SP1 is around a middle part of all the blocks N+1. That is, a variable D is stored with a value INT ((N+1)/2), and concurrently a color of the D block is changed to a color 1 of a determined movement block and shown in the screen.

Figure 11:
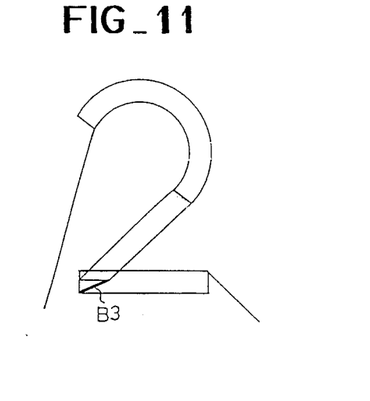

In the example of the character "2", the block number N+1 is 6, and when it is changed to the correcting mode, at first the 3rd block (B3) of the straight stitching is designated as shown in FIG. 11 and is changed to the determined color 1 (thick line of the same).

(MOVEMENT DESIGNATING INSTRUMENT)

Subsequently, an input of a signal is waited for, and the input part of the function of the tablet is pointed at with SP2. When UP signal is input, a later mentioned condition D<N is judged, and in case of yes, the color of the D block is returned to the initial one, and the variable D is increased by 1, and a new color of the D block is changed to the determined color 1 and returned to the input-waiting.

Figure 12:
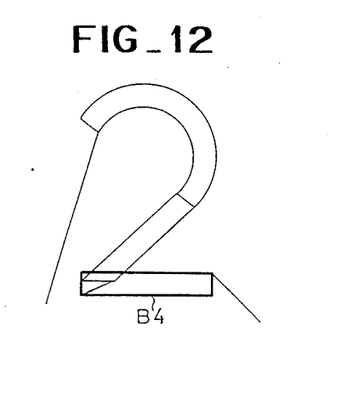

In the example of the character "2", when UP signal is input, the designation is backward moved by 1 block toward the 4th block as shown in FIG. 12.

When DOWN signal is input, a later mentioned condition D>0 is judged by SP3, and in case of yes, the color of the D block is returned to the initial one, and the variable D is decreased by 1, and a new color of the D block is changed to the determined color 1 and returned to the input-waiting.

Figure 10:
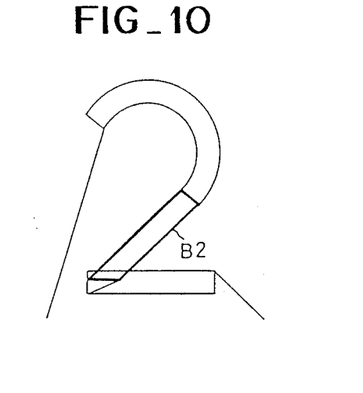
FIGS. 10 to 12 explain the designations of the blocks.

In the example of the character "2", the input part of the function of the tablet is pointed, and when DOWN signal is input, the designation is forward moved by 1 block toward the 2nd block (B2) as shown in FIG. 10.

(PROHIBITION INSTRUMENT)

The judgments of conditions D<N and D>0 when inputting UP signal and DOWN signal confirm that the designations of the blocks fall in the composing ranges from 0 to N blocks, and in case of n0, a buzzer notifies by SP4 that they are out of the range, and movement of the block is prohibited.

(DECISION INSTRUMENT)

If the input signal at the function input part of the tablet by SP5 determines a starting point or a finishing point, the P counter is confirmed, and if P=0, the variable S0 is stored with value D, and P=1 is set. In case of P=1, the variable S1 is stored with value D, and P=1 is obtained to finish the designation of the range.

(DISPLAY INSTRUMENT OF BLOCK RANGE)

Figure 2:
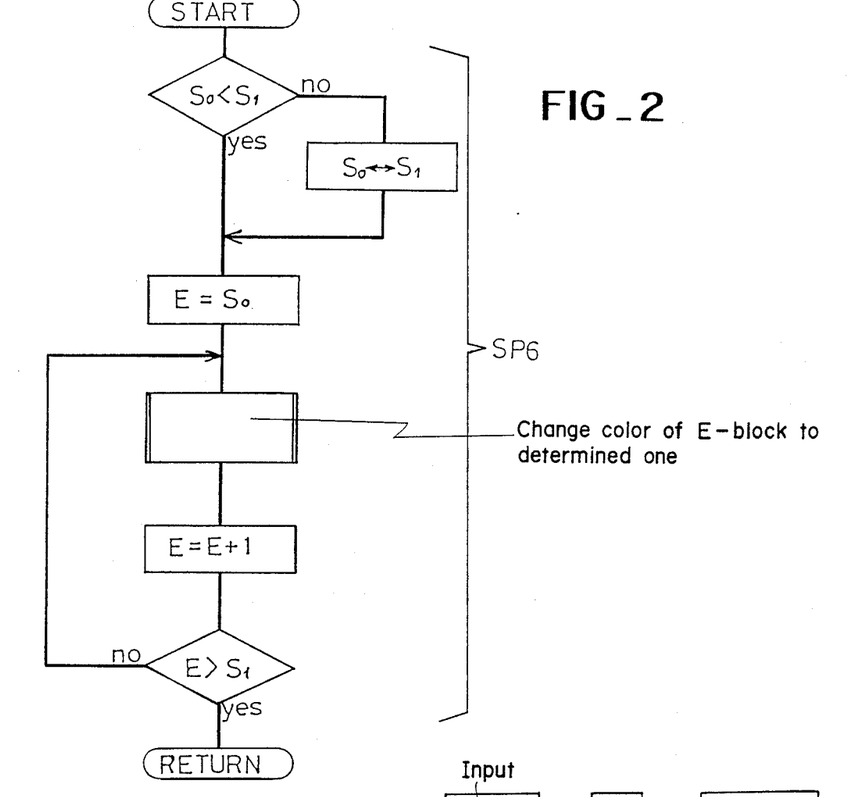
FIG. 2 is a flow chart for showing a designated scope of the block.

When the designation of the range of the block is finished in the program flow of FIG. 1, the color 1 is changed to the determined color 2 by the sub-routine shown in FIG. 2, which shows by SP6 that each of the blocks from the starting point to the finishing point is designated in the range thereof.

At first, a comparison is made between a value showing a starting block number stored in the variable S0 and a value showing a finishing block number stored in the variable S1. If S0<S1 the variable are left unchanged, and if S0=S1, the values of S0 and S1 are exchanged, and the variable E is stored with the value S0, and the E block is changed to the determined color 2. The blocks from the S0 block to the S1 block are changed to the determined color 2 and shown in the display device.

(POINT DISPLAY INSTRUMENT)

Figure 3:
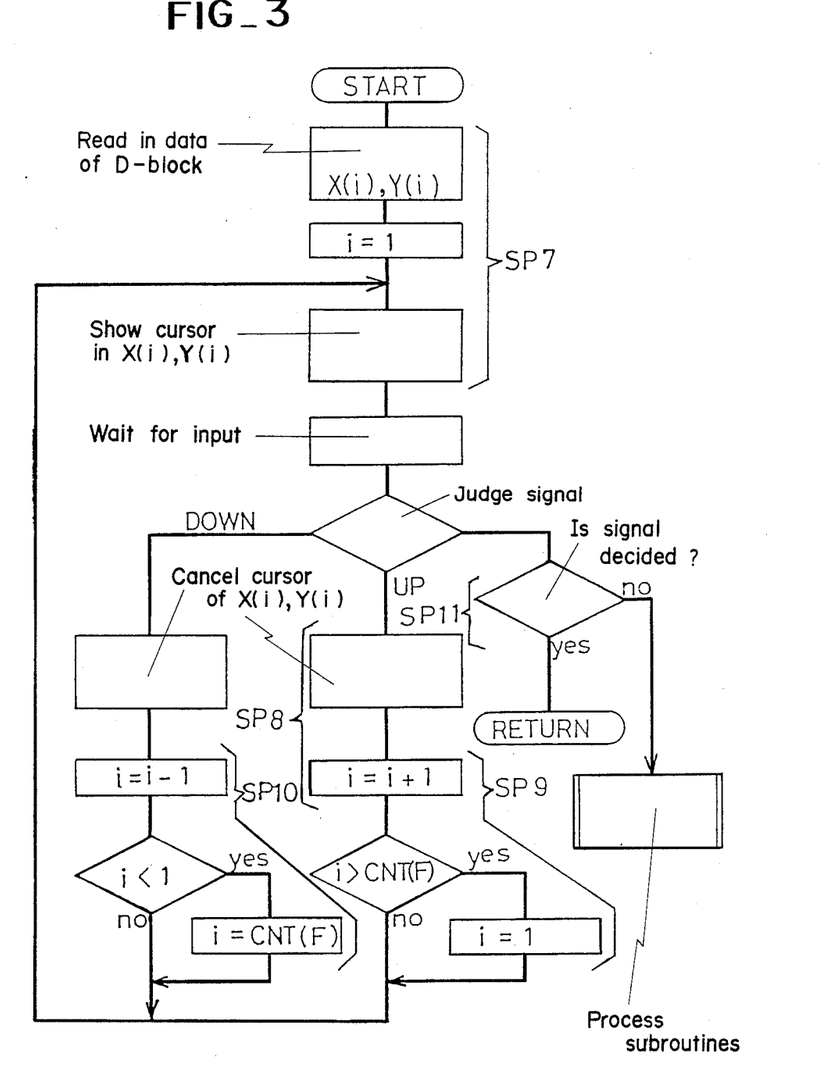
FIG. 3 is a flow chart for designating one coordinate point within the block.

FIG. 3 illustrates a program flow in the case when one point to be corrected is designated.

The D block is selected including one point to be corrected, and a point is made with SP7 to a correction to one point of the function input part of the tablet, and when one point correction is designated, the data of the D block is read in the variables X(i), Y(i), and "i" is changed to "1" and the cursor is shown at one point within the D block, and the input of the signal is waited for. When UP signal is input by SP8, the cursor is eliminated and a counter is increased by 1.

(MOVEMENT CONNECTING INSTRUMENT)

If "i" exceeds a composing input counting number of the block by SP9, the "i" counter is changed to "1" and again returned to showing of the cursor.

When DOWN signal is input by SP10 under a condition that the 1 counter is 1, the "i" counter is set at CNT(F).

The cursor is shown at the final input point of the block.

CNT(F) is a counting point of the composing coordinate of the stitching block, and its value is equal to "n" of the point of the composing coordinate.

In the judgment of the signal, the function signal is input by SP11, and if this is a decision signal, the input point having now been designated is decided as an input point to be corrected, and this subroutine is finished.

An example will be explained in connection with the embroidering pattern of the character "2".

Figure 13:
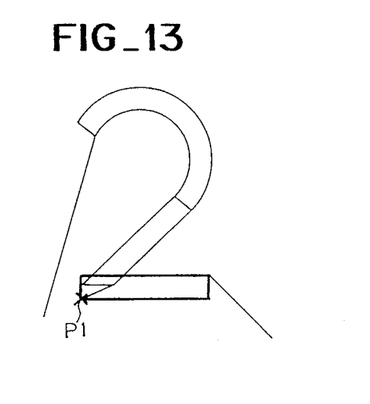
FIGS. 13 to 15 explain the designations of the input coordinate points within the blocks.

A block containing point(s) to be corrected is selected as shown in FIG. 13, and when it is changed to one point correcting mode, the cursor is shown at the 1st point (P1) of the composing input point (four points in this example) of the block.

Figure 14:
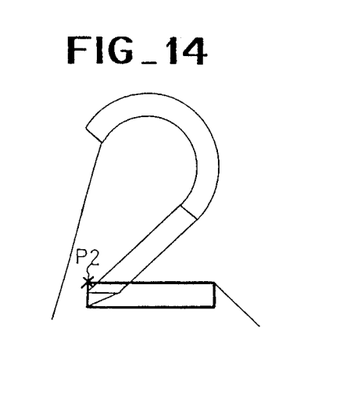
Figure 15:
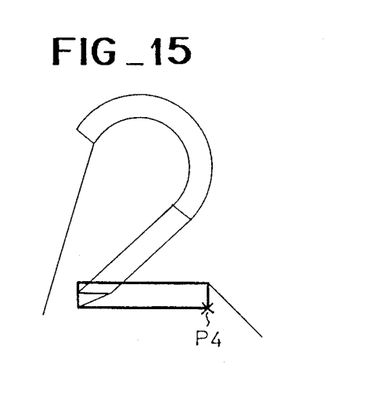

When UP signal is once input, the cursor is moved to the 2nd point (P2) as shown in FIG. 14, and when the cursor is twice input the cursor is moved to the last point (P4) of the composing input point as shown in FIG. 15, and when UP signal is again input from the condition of FIG. 14, it is returned to the condition of FIG. 13.

When DOWN signal is input, a reverse to the case of UP signal takes place, and when the decision signal is input, this point is memorized and the correction is possible.

(EFFECT BY 1ST EMBODIMENT)

According to the 1st embodiment of the invention, embroidering patterns such as letters or numeric characters are divided into a plurality of blocks and those are input and the input orders are stored. In the data input device of the sewing machine which shows the imaginary outline on CRT, the blocks are moved one after another by the correcting mode before or after the input order so as to determine one range or a plurality of ranges of the blocks to be corrected. In the one point correcting mode, the input point within the designated block is moved and stored before or after the input order, and since the input point to be corrected is decided, the correction is made instantly and easily.

(2ND EMBODIMENT)

This invention will be explained with reference to a 2nd embodiment.

The 1st embodiment moves and designates the block in the correcting mode before or after the input order of the block so as to decide one range or a plurality of ranges of the blocks to be corrected. However, the present embodiment freely designates the block by direct point designation in the correcting mode, irrespectively of the input order thereof so as to determine one or a plurality of the block ranges. Due to the inherent nature of this embodiment, when designating the block in the 1st embodiment, if the block moves over the composing range, there is installed a means which indicates this condition by sound or light. Other program stages are the same as in the 1st embodiment.

Figure 4:
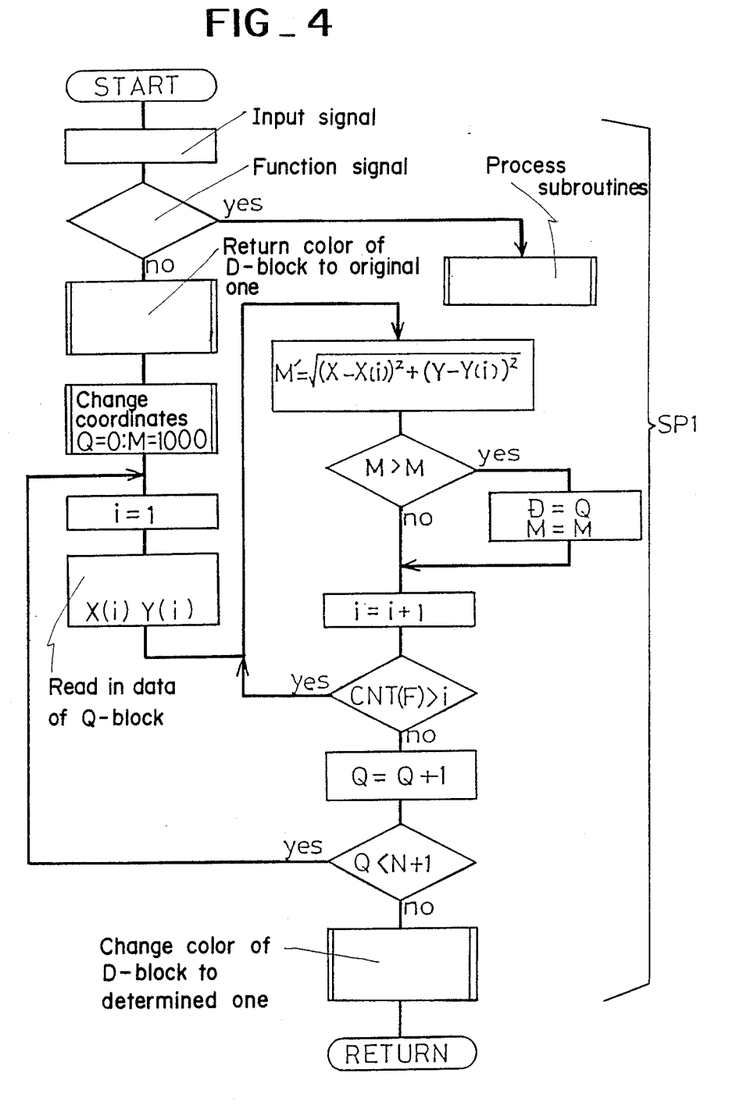
FIG. 4 is a flow chart for designating the block by directly designating a coordinate point.

A designation of the block by "SBDP" of the direct point designation will be explained with reference to the subroutine in FIG. 4.

(POINT DESIGNATING INSTRUMENT)

If the signal having been input by SP12 is a signal showing a value of the coordinate, the color of the D block is returned to the initial one.

The value of the input coordinate is inverted at storing the data by the subroutine of the coordinate inversion, and at the same time, the Q counter is cleared, and "M" is stored with sufficiently large value.

The "i" counter is set to 1, and after the coordinate data of the Q block are read in the variables X(i), Y(i), the distance between the coordinate data X and Y is calculated and stored into M'. If M' is smaller than M, a value of the Q counter is input into D, and M=M' is provided. This operation is repeated CNT(F) times.

CNT(F) is a point of the composing coordinate in the stitching blocks. Each time when one block is finished, Q counter is increased by 1, and the distance between the coordinate data X and Y is calculated with respect to points of the composing coordinate of all the blocks (N+1), and a judgment of condition M>M' takes place, and a number of a block having coordinate data closest to X and Y is stored into D. When the above mentioned operations are finished, the color of the D block is changed to the determined color 1, and the routine SBDP is finished.

In the example of the character "2", if the point A is input at the condition of FIG. 10, a designation is made to the 4th block (B4) having a point closest to the point A in the six blocks by means of "SBDP" of the direct point designation, and the exhibition is that as shown in FIG. 12.

(EFFECT OF THE 2ND EMBODIMENT)

As said above, according to the 2nd embodiment, the designation of the block in the correcting mode is substituted for the 1st embodiment, the block is freely designated by the direct point designation, irrespectively of the input order, and one range or a plurality of ranges of the blocks to be corrected are decided. Therefore, the correction may be instantly and more easily in comparison with the 1st embodiment.

What is claimed is:

1. A data input device having an editing function for an embroidering pattern to be made by a sewing machine, which device inputs a plurality of separate data blocks each including a predetermined number of coordinated points for composing the embroidering pattern such as a letter or a numeric character, stores input orders thereof, and shows the outline of the pattern in a display device, comprising means for performing an editing function composed of:

first mode changing means which are initially operated to change a data input mode into a correcting mode and in the correcting mode, showing in the display device the stored pattern as composed of the separate blocks inclusive of a predetermined reference block situated near a middle part of the pattern and having a determined color different from that of the remaining blocks;

first designation means operated to designate at least one of the blocks to be corrected by progressively counting the blocks up or down relative to said reference block of the predetermined color, and to show the designated block to be corrected with said predetermined color in place of the reference block;

second mode changing means operated to change the data input mode into a one-point correcting mode to progressively indicate with a cursor the coordinate points pertaining to the designated block to be corrected;

second designation means operated to shift the cursor first to the last one of the coordinate points pertaining to the designated block to be corrected by progressively counting up the coordinate points, so as to designate one of the coordinate points to be corrected;

first determining means operated after designation of one of the blocks to be corrected to determine the one block to be corrected; and second determining means operated after designation of one of the coordinate points to be corrected to determine the one coordinate point to be corrected.

2. The device as defined in claim 1, further comprising means for shifting the cursor to the first coordinate point of the designated block to be corrected when the coordinate points are counted up beyond the last coordinate point of said block.

3. A data input device having an editing function for an embroidering pattern to be made by a sewing machine, which device inputs a plurality of separate data blocks each with a predetermined number of coordinate points for composing the embroidering pattern such as a letter or a numeric character, and stores the input orders thereof, and shows the outline of the stored pattern in a display device, comprising means for performing an editing function composed of:

first mode changing means initially operated to change a data input mode into a correcting mode to show in the display device the stored pattern as composed of the separate blocks with one predetermined reference block thereof having a determined color different from that of the other blocks, the reference block being situated near a middle part of the pattern;

means for inputting a coordinate point in reference to one of the blocks to be corrected;

first designation means responsive to the input coordinate point to calculate out the distances between the input coordinate point and the coordinate points defining the blocks, said means designating one of the blocks to be corrected, which includes a coordinate point located nearest to the input coordinate point;

second mode changing means operated to change a data input mode into a one-point correcting mode to progressively indicate with a cursor one of the coordinate points defining the designated block to be corrected;

second designation means operated to shift the cursor first to the last one of the coordinate points defining the designated block to be corrected by progressively counting up the coordinate points, so as to designate one of the coordinate points to be corrected;

first determining means operated after designation of one of the blocks to be corrected to determine the one block to be corrected, and second determining means operated after designation of one of the coordinate points to be corrected to determine the one coordinate point to be corrected.

4. The device as defined in claim 3, further comprising means for shifting the cursor to the first coordinate point of the designated block to be corrected when the coordinate points are counted up beyond the last coordinate point of the block.

* * * * *